United States Patent [19]
Bianconi et al.

[11] Patent Number: 5,426,160
[45] Date of Patent: Jun. 20, 1995

[54] PROCESS FOR THE ADDITION OF FUNCTIONAL GROUPS TO POLYSILYNE POLYMERS

[75] Inventors: Patricia A. Bianconi; David Smith, both of State College, Pa.

[73] Assignee: The Penn State Research Foundation, University Park, Pa.

[21] Appl. No.: 49,723

[22] Filed: Apr. 20, 1993

Related U.S. Application Data

[63] Continuation of Ser. No. 932,849, Aug. 20, 1992, abandoned, which is a continuation of Ser. No. 573,517, Aug. 27, 1990, abandoned.

[51] Int. Cl.$^6$ .......................................... C08F 283/00
[52] U.S. Cl. ...................................... 525/474; 528/10; 528/25
[58] Field of Search ..................... 325/474; 528/10, 25

[56] References Cited

U.S. PATENT DOCUMENTS

| | | | |
|---|---|---|---|
| 4,139,403 | 9/1979 | Baum et al. | 149/88 |
| 4,203,914 | 8/1980 | Finke et al. | 556/428 |
| 4,482,729 | 6/1984 | Ishikawa et al. | 556/446 |
| 4,508,887 | 7/1985 | Kohl | 528/21 |
| 4,689,382 | 8/1987 | Lebrun et al. | 528/12 |
| 4,695,643 | 9/1987 | Oertle et al. | 556/428 |
| 4,722,987 | 2/1988 | Ikeno et al. | 528/23 |
| 4,774,310 | 9/1988 | Butler | 528/23 |
| 4,801,657 | 1/1989 | Risse | 525/471 |
| 4,839,451 | 6/1989 | Badesha et al. | 528/10 |
| 4,861,844 | 8/1989 | Lebrun et al. | 525/475 |
| 4,866,145 | 9/1989 | Dicker | 526/190 |
| 4,882,450 | 11/1989 | Bortolin | 528/43 |
| 4,952,658 | 8/1990 | Kalchauer et al. | 525/474 |
| 4,987,202 | 1/1991 | Zeigler | 528/10 |

OTHER PUBLICATIONS

Matyjaszewski et al., Inorganic and Organometallic Polymers, Amer. Chem. Soc. (Jun. 1988), Chap. 6 pp. 78–88.

Matyjaszewski et al., J. of Organometallic Chemistry, 340 (Apr. 1988), Elsevier Sequoia SA, pp. 7–12.

Bianconi et al., Poly(n–hexysilyne): Synthesis and Properties, etc., JACS (Jun. 1988), vol. 110, No. 7, pp. 2342–2344.

Bianconi et al., Ultrasound Mediated Reductive Condensation, etc., Macromolecules (Jun. 1989), No. 22, pp. 1697–1704.

Matyjaszewski et al., Silicon–Based Polymer Science, Advances in Chemistry Series, 224, ACS (Feb. 1990), pp. 285–298.

Kung et al., J. Vac. Sci. Technology, B*(6), (Feb. 1990), pp. 1820–1825.

Ngyori et al., Trimethysilyl Triflate in Organic Synthesis, Tetrahedron (Mar. 1981) vol. 37(23), pp. 3899–3910.

Webster et al., Group-Transfer Polymerization, et al., J. Am. Chem. Soc. (Apr. 1983) vol. 105, pp. 5706–5708.

Yenca et al., Modifications of Polysilanes, Chem. Abst. (May 1987) vol. 107, No. 176600n.

Matyjaszewski et al., New Synthetic Routes to Polysilanes, Chem. Abst. (Apr. 1988) vol. 109, No. 23472p.

Matyjaszewski et al., Modification of Polysilanes, Chem. Abst. (Apr. 1988) vol. 109, No. 55367z.

Hrkach et al., Grafting of Living Polymers, etc., Chem. Abst. (Apr. 1988) vol. 109, No. 211573w.

Hrkach et al., Grafting of Living Polymers, etc., Chem. Abst. (May 1989) vol. 111, No. 97893q.

Bianconi et al., Polyalkylsilynes: synthesis etc., Chem. Abst. (May 1989) vol. 111, No. 115869t.

Primary Examiner—Melvyn I. Marquis
Attorney, Agent, or Firm—Thomas J. Monahan

[57] ABSTRACT

A process for the addition of functional groups to polysilyne polymers is disclosed. A solution of a poly(phenylsilyne) polymer is reacted with triflic acid. The reaction product is then reacted with a reagent selected from the group consisting of an alkyllithium reagent, a Grignard reagent, an alkoxide salt, and an amide salt to form a resultant polysilyne polymer. The resultant polysilyne polymer may be pyrolyzed to form a silicon-based ceramic.

11 Claims, No Drawings

PROCESS FOR THE ADDITION OF FUNCTIONAL GROUPS TO POLYSILYNE POLYMERS

This is a continuation of copending application Ser. No. 07/932,849 filed on Aug. 20, 1992, which is a continuation of Ser. No. 07/573,517 filed on Aug. 27, 1990, both now abandoned.

Unusual combinations of properties continue to be discovered in inorganic and organometallic macromolecules which serve to continue a high level of interest in potential applications for these materials. Linear silicon-silicon bonded polymers, for example, have been the focus of intense research, and many applications for these materials (as SiC precursors, photoinitiators, photoresists, photoconductors, and nonlinear optical materials) have emerged. The source of their electronic and optical activity, as well as their usefulness as precursors to SiC ceramics, is their all silicon backbone. In addition to bestowing high silicon content which increases ceramic yields, the uninterrupted runs of silicon-silicon bonds permit sigma-"conjugation", or the delocalization of both Si—Si bonding and close-lying antibonding states along the polymer backbone. This property gives rise to the interesting photophysical and electronic properties of these inorganic-backbone polymers.

Although linear polysilanes of formula $[R1R_2Si]_n$ which bear a wide variety of alkyl and aryl substituents have been prepared and investigated, there has been little progress until recently towards the preparation and characterization of monoalkyl silicon $[RSi]_n$. By direct analogy to carbon-based polymers, materials with a 1:1 alkyl to silicon ratio could adopt discrete aromatic structures or take the form of linear conjugated polymers analogous to the polyacetylenes. Alternatively, and more consistent with the decreased tendency of the lower Group 14 elements towards $\pi$-bonding, an all sigma-bonded network structure which has no carbon analogue may be adopted. In this case, such network materials, viewed as the halfway point between polysilanes and elemental silicon should exhibit an unusual array of properties. The increase in sigma-conjugation and electron delocalization that would occur upon going from a linear array of Si—Si bonds to a three dimensional network of these bonds should convey unique new photophysical and optical characteristics to the materials. Such network silicon polymers could behave as soluble size-confined semiconductor clusters, materials which are presently the focus of intense research interest and which are finding an increasing number of applications.

Recently Bianconi and Weidman reported [See J. Am. Chem. Soc., 110:2342 (1988); and Macromolecules 22:1697 (1989)] the synthesis of a new class of silicon-backbone polymers of stoichiometry $[RSi]_n$, which were called poly(n-alkylsilynes). Although this stoichiometry might suggest a structural analogy between polysilynes and polyacetylenes, the polysilynes actually adopt a sigma-bonded network structure unprecedented in carbon-based polymers. Chemical and spectroscopic analysis indicated that these materials are constructed primarily of $sp^3$-hybridized monoalkylsilyne moieties assembled into rigid but irregular networks via Si—Si sigma-bonds. Polysilynes therefore represent structural as well as stoichiometric intermediates between linear polysilanes and amorphous silicon.

The unprecedented structure of the new polysilynes was found to impart unique properties, many of which stem from the polymers' structural similarity to a soluble form of amorphous silicon. Unlike the strong, discrete sigma—sigma transitions which linear polysilanes display in the near UV range, the polysilynes exhibit an intense UV absorption band edge tailing down into the visible, with integrated absorptions per Si atom far exceeding those measured for linear polysilanes. In addition, the absorption is blue-shifted but similar in shape and intensity to that of amorphous silicon, and both its breadth and intensity appear to arise from the extension of the Si—Si sigma-"conjugation" observed in linear polysilanes into three dimensions across the polysilyne network.

The solution structure and dynamics of these new polymers also confirms the analogy to solubilized clusters of amorphous silicon. Although the polymers remain freely soluble in common organic solvents (from which they can be spun into transparent high quality films), they appear to be extremely rigid even in solution, with backbone rigidity approaching that of the solid state. Motion in the polymer side chain seems severely restricted as far as the third atom out from the backbone, as evidenced by solution NMR studies. The polymer backbone's electronic characteristics therefore remain largely unaltered by the solvent or medium in which the polymer is placed, and appear to be affected only by the size of the polymer "cluster" and the electronic characteristics of the alkyl substituents. This gives rise to the possibility of functionalizing the backbone with groups which are specifically tailored to interact with a desired solvent or substrate, while the characteristic polysilyne electronic and photopatterning properties are retained. This represents a fundamental advantage over linear polysilanes as electronic materials, as this versatility is not as possible with them. The electronic properties of linear polysilanes are greatly affected by factors such as solvent medium which change the flexible backbone conformation, and they therefore display differing electronic properties in different environments.

The unique and potentially useful photochemistry of the polysilynes also demonstrates their likeness to solid amorphous silicon. Upon irradiation of linear polysilanes in oxygen, photofragmentation occurs and both silylenes ($R_2Si$:) and cyclic siloxane oligomers are extruded. The polymer is thus easily photoablated, and this property has led to the study of polysilanes as positive photoresists for microlithography. In sharp contrast, on exposure to oxygen and UV light, polysilyne films undergo photooxidation accompanied by crosslinking instead of fragmentation to give insoluble siloxane networks. The siloxane network polymers obtained by this photoxidation display physical characteristics markedly different from those of the parent polysilynes. The siloxanes are insoluble in common organic solvents (probably due to crosslinking by the oxo groups) while the polysilynes are etched. Thus, polysilynes have potential applications as dry-developing negative photoresists for microlithography or as photopatterned protective coating. The siloxanes are transparent to near UV and visible light, while the polysilynes absorb throughout the UV into the visible; the siloxanes also display a remarkably large difference in refractive index from the silynes. These properties suggest that polysilynes have potential novel applications as self-developing thin film optical waveguide media. Altogether, the polysilynes represent materials which can be photopatterned without loss of film quality (through swelling from use of solvents as developers) or film integrity (through photoablation) and whose pattern resolution is not limited by the generation of side products to the photoreaction (as is that of the polysilanes). The materials' self-developing properties (in which a pattern can be directly "written" into the polymer without any further development or processing step) represent a significant advantage over current microlithographic technologies.

The good solubility and network structure of the polysilynes also make them potential candidates for polymeric precursors to silicon-based ceramics. Pyrolysis mass spectra of the polyalkylsilynes show only the respective 1-alkene and smaller alkyl fragments, and no major silicon-containing fragments are volatilized. In contrast, mass spectra of linear polysilanes show fragmentation into a variety of silyne and higher oligomeric components. This difference in pyrolysis behavior can be directly related to the difference in structure of the two classes of polymers: that is, to the greater propensity of the network structure over the linear to enforce retention of silicon atoms. When films of the polyalkylsilynes are pyrolyzed they convert directly (without the pretreatment required for linear polysilanes) to mixtures of silicon and silicon carbide, with the weight of retained silicon in the ceramic products as high as 95% of the weight of silicon in the starting polymer. Choice of alkyl substituents affect the ratio of Si:SiC in the product mixture, suggesting that the polymers can be synthetically tailored to give the ceramic of choice.

This new class of polysilyne network polymers therefore display great potential for many material applications since (1) they are potentially easily tailorable by changes in functionality, and because of their solubility they are easily processable materials for any application (such as use in photovoltaic cells or nonlinear optical devices) in which a spin-on electronically or optically active layer is desirable, (2) they can be photopatterned in situ, to give layers or coatings of the desired characteristics with high resolution, (3) their network structure, high silicon content, and easily tailorability and processability make them optimum yet versatile candidates for polymeric precursors to silicon-based ceramic films.

Current synthetic approaches to polysilynes are limited to producing polymers which contain only hydrocarbon side chains. At present, therefore, only a few representatives of this novel class of polymers have been synthesized, and synthetic tailoring to take full advantage of the polysilyne backbone properties is not possible. The current synthetic procedure requires reaction of alkyltrichlorosilane monomers, $RSiCl_3$, with an ultrasonically-generated emulsion of NaK alloy and an organic solvent according to the following equation 1 in which R can be an alkyl of three to an unlimited number of carbon atoms in length, including cyclic moieties, among which are cyclohexyl, phenyl, isobutyl, amyl, n-dodecyl, n-propyl, n-butyl, n-hexyl, and isopropyl moieties (R cannot contain isolated double bonds or most heteroatoms-including O, F. Cl, etc.); and wherein n is a number of indeterminate length (n is used to indicate the repeating character of the monomeric units throughout the description of the present invention and is not meant to be a fixed number defining a polymer of specific length) but usually, in the instance of the following equation is not larger than 1000 and preferably in the range of 300 to 1000.

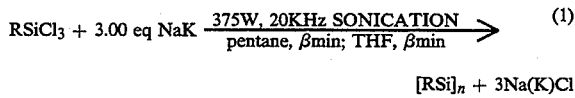

$$RSiCl_3 + 3.00 \text{ eq NaK} \xrightarrow[\text{pentane, }\beta\text{min; THF, }\beta\text{min}]{375W, 20KHz \text{ SONICATION}} \quad (1)$$

$$[RSi]_n + 3Na(K)Cl$$

High-intensity ultrasound allows reductive condensation of alkyltrichlorosilanes to be performed under more homogeneous conditions in inert alkane solvents, eliminating monomer-solvent side reactions and other complications associated with the need for ethereal solvents and electron-transfer reagents. It also promoted uniform reduction and assembly of the monomers into soluble networks without occlusion of unreacted Si-Cl sites. This procedure, although the only one present known by which high molecular weight polysilyne networks can be assembled, has several drawbacks. First, the desired $RSiCl_3$ monomer must exist as a stable molecule. This precludes the synthesis of such polysilynes as [ROSi]n or [$R_2$NSi]n; the first containing a very electron-rich silicon network backbone (due to the donating alkoxide substituent); and may show enhanced nonlinear optical activity over alkyl-substituted polysilynes. The second represents an almost ideal stoichometry for a polymeric precursor to $Sl_3N_4$ ceramic films. However, the necessary monomers ($ROSiCl_3$ and $R_2NSiCl_3$) do not exists as stable molecules, since they undergo self-condensation at room temperature with the nucleophilic atom (O or N) each contains and thus redistribute their substituents. thus, these potentially useful functionalized polymers are not accessible via the usual synthetic route to polysilynes.

Other potentially useful polysilynes are not accessible via the usual synthetic route due to lack of solubility of their intermediates. For example, [MeSi]n would perhaps be an excellent precursor to silicon carbide, having a perfect 1:1 Si:C ratio and needing only one to lose 1.5 eq of $H_2$ upon pyrolysis. But reductive condensation of $MeSiCl_3$ with NaK alloy emulsion results only in the precipitation of incompletely reduced polychlorinated material. The single methyl group is not sufficiently solubilized for these intermediates, and so they precipitate from solution before the reaction is complete. This potentially important polymeric ceramic precursor has therefore never yet been synthesized.

A more general limitation of the NaK alloy emulsion synthetic route to polysilyne networks is that no side-chain functional group can be introduced which cannot survive the extremely reducing conditions needed to assemble the network backbone. For example, halogenated side chains [wherein $R=(CF_2)_nCF_3$, or $(CH_2)_nCH_2Br$] would themselves be reduced and destroyed during the reductive condensation of the $RSiCl_3$ monomers. Side chains containing a remote polar group ($R=(CH_2)_nCOOR$, for example), which could be used to make water=soluble polysilynes, cannot be introduced for the same reason. In fact, nearly all functional groups except hydrocarbons are excluded by this limitation.

The first aspect of the present invention is, therefore, to describe a general synthetic route to the functionalization of polysilyne networks. From this one synthetic route according to the present invention, and an inexpensive and easily assembled precursor polymer, a wide variety of silyne networks of many different surface characteristics could be obtained.

A route to functionalization of inorganic polymers which has been successful with other inorganic systems is the formation of the polymer backbone with simultaneous or subsequent introduction of a reactive site which can be functionalized. For example, many members of the extremely wide-ranging class of substituted polyphosphazene polymers are derived from functionalization of the parent chloro-substituted polyphosphazene backbone, as depicted in the following equation 2 in which R may be any alkyl or aryl group and n is usually about 10,000 [see Allcock, H. R., in Design of New Materials, D. Cocke and A. Clearfield, eds., Plenum Press, New York, ppg 67-78 (1987).]

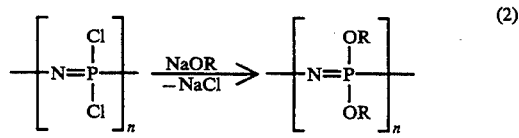
(2)

In silicon-based polymers, a reactive site has been introduced only subsequent to formation of the Si—Si bonded backbone. A reaction of aryl-substituted silane oligomers with hydrohalic acids (for HCl and HBr, in the presence of a Lewis acid catalyst) cleaves off an equivalent of benzene, leaving the silicon atom functionalized with the reactive halide ligand (see equation 3 and scheme 2). This reaction was selective for aryl substituents, and so alkyl groups were left unperturbed (see equation 4). The reactive halide ligands can then be substituted by alkyl or hydrido groups as depicted in the following equation 4 and scheme 2:

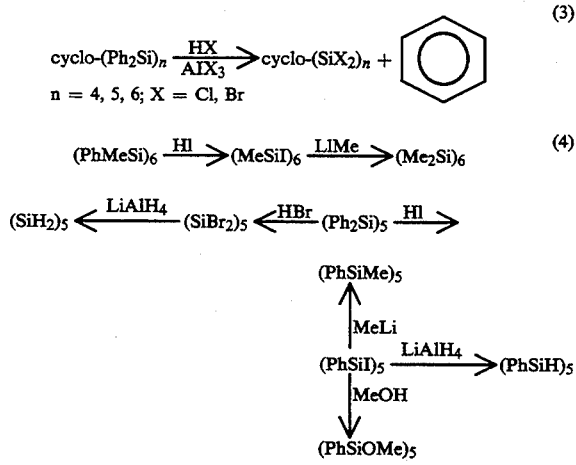

Scheme 2

This selective functionalization of silanes may be extended to polysilane high polymers. Phenyl or other aryl groups were selectively replaced by halogens by treatment with hydrogen halide and a Lewis acid. Reaction of the chloride-substituted polymer with n-butyllithium replaced most of the chlorides with butyl groups as depicted in the following equation 5 in which n is usually a numeral of approximately 10,000:

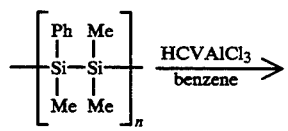
(5)

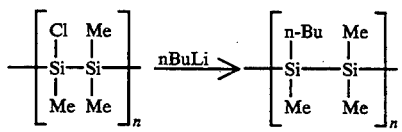

More recently, Matyjaszewski et al. showed that polysilane high polymers could be functionalized via a similar reaction using triflic acid HSO3CF3, in place of hydrohalic. The reaction was quantitative and selective for aryl substituents, and subsequent reactions of the triflate-bearing intermediate polymer led to substitution of the triflate and selective functionalization of the Si site as shown in the following equation 6 in which n is usually a numeral, of approximately 10,000:

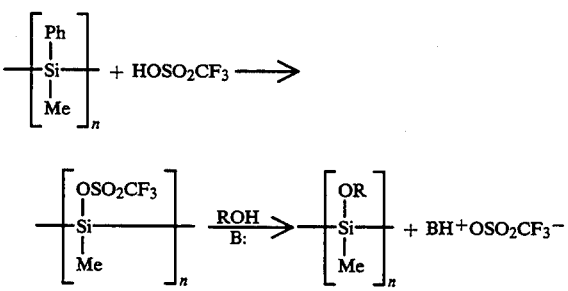

The process according to the present invention provides a method for the functionalization of poly(phenylsilyne) with trifluoromethanesulfonic acid (triflic acid), yielding a new copolymer consisting of 70% poly(phenylsilyne) and 30% poly(n-hexylsilyne). Although the functionlization process is described in detail in the following examples, the invented procedure can be easily altered to synthesize a wide variety of copolymers containing other substitutents. Therefore, this new process is a method whereby the physical properties of polysilynes may be tailored to meet the requirements of specific applications for this polymer.

The first step in the functionalization process according to the present invention is to synthesize poly(phenylsilyne). This synthesis is similar to that published by Bianconi and Weidman for the synthesis of poly(n-butylsilyne). NaK alloy, a reducing agent, is used in a tetrahydrofuran (THF) solvent system, which is emulsified by high intensity ultrasound. Phenyltrichlorosilane monomer is then added slowly to the NaK/THF emulsion, which through a reductive condensation reaction, polymerizes to form poly(phenylsilyne). Residual chlorines are removed with phenylmagnesium chloride, then the polymer solution is quenched with water. Precipitation and purification of the polymer is accomplished through methanol/THF and ethanol/THF sequential systems.

Once poly(phenylsilyne) is purified and dried, it is dissolved in a methlylen chloride/toluene co-solvent system in preparation for the functionalization procedure. A measured amount of triflic acid (HOTf) (an amount sufficient to obtain 30% removal of phenyl substituents from the dissolved poly(phenylsilyne)) is slowly added to the stirred polymer solution in a nitrogen atmosphere drybox. The result of this step is a highly reactive copolymer of 70% poly(phenylsilyne), 30% poly(triflatesilyne), and a stoichiometric amount of benzene formed from the proton of triflic acid and the removed phenyl groups of poly(phenylsilyne). The general reaction for the formation of this intermediate product is depicted in the following example 7 in which n is usually a numeral of approximately 300:

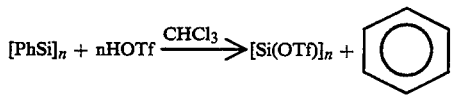
(7)

The triflate group which is now bound to the silicon polymer is a highly reactive leaving group, which can be removed by reaction of the polymer with a variety of functionalizing agents such as alkyllithium reagents, Grignard reagents containing saturated or unsaturated groups with halogens, amines, ethers, acids, ketones, etc, or alkoxide or amide salts to give functionalized polysilynes according to equation 8:

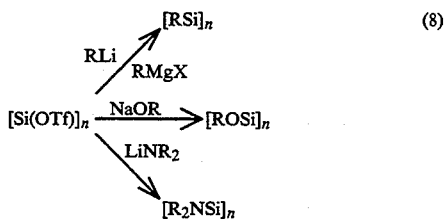
(8)

In Equation 8, n represents the repeating character of the monomeric silynes rather than a polymer of specific length, and R represents any alkyl or aryl group of indeterminant length containing at least one double bond or heteroatom. Reaction of the intermediate triflate polymer [Si(OTf)]$_n$ with n-butyllithium, for example, gives the known poly(n-butylsilyne).

Polysilynes have already been shown to undergo analogous substitutions at reactive sites. In the standard workup used in the synthesis of the n-alkyl-substituted polymers, Grignard reagents are added to replace any residual Si—Cl bonds with alkyl groups, thereby "capping" the polymer and improving it stability as depicted in the following equation 9:

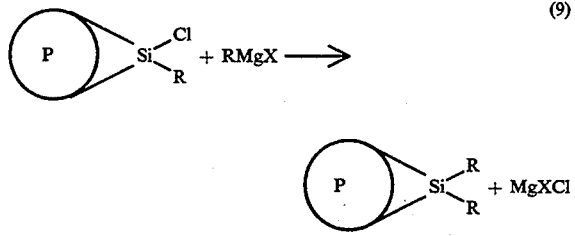
(9)

These substitutions, even of the more strongly-bound chloride, are essentially quantitative. The triflate is much more weakly bound and should be easily substituted. If the degree of substitution of the triflate by a particular sidechain is not quantitative, the remaining triflate sites can be "capped" with an alkyl or aryl Grignard reagent as shown in Equation 9.

Variations on this technique can be introduced to overcome possible synthetic problems. For example, if the fully triflated polymer is not sufficiently soluble in some desired solvent, a copolymer of poly(phenylsilyne) with a poly(alkylsilyne) having a long-chain alkyl group can be used as the precursor as seen in the following equation 10:

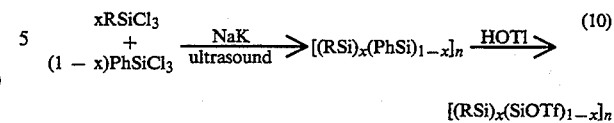
(10)

$[(RSi)_x(SiOTf)_{1-x}]_n$

In equation 10, R is, but need not be, a long-chain alkyl of approximately 300 repeating monomeric (n) units. Since the triflated-substituting reaction is selective for aryl substituents, the n-alkylsilyne sites should be unaffected and remain intact to help solubilize the triflate-bearing intermediate as well as the final polymer product. Solubility or surface properties of the intermediate and product polymers can be varied by the choice of the spectator sidechain and the amounts of its incorporation into the precursor polymer.

Once obtained, the newly functionalized polysilynes can be purified and characterized in the standard manner, and the degree of functionalization can be determined by multinuclear NMR. The fundamental advantage of this technique is that a polysilyne network backbone can be easily assembled from inexpensive and readily commercially available monomer. More exotic side chains can then be substituted, or any combination of side chains which will give the final polymer the exact surface or electronic/optical properties needed can be introduced.

Once formed the synthesis and applications of poylsilynes according to the present invention may be tailored with specific properties. For example, fluorinated polysilynes may be tailored to provide waveguide and resist materials with stable, low resistance surfaces.

The fluorination of surfaces is a well-established route to give the surface enhanced stability, lubricity, and fluidity, and fluorination has been used to modify many surfaces (such as silica) to improve their physical properties. Fluorine substitutents are also very electron-withdrawing, and fluorinated alkyl or alkoxide groups have been used to modify the electronic properties of polymer backbones. Polysilynes bearing fluorinated substituents should display enhancement of the surface properties listed above, giving better quality, more stable films having better interfaces with a wide range of substrates. The polysilyne/SiO$_2$ interface, for example, should be improved by fluorination of the sidechains which actually interact with the surface, over the hydrocarbon sidechains which are now available. Such improved interactions could be seen with almost any inorganic substrate, as the interaction with fluorinated sidechains will almost always be more favorable than with hydrocarbon groups.

Polysilynes with fluorinated substituents will also, due to the electron-withdrawing properties of fluorine, have more electron-poor backbones. This could potentially improve the stability of polysilyne films and devices by rendering the backbone more stable to long-wavelength light. While the high-intensity, short-wavelength end of the backbone's UV absorption (which confers the observed high photopatterned resolution) is retained or only minimally depleted, the low-intensity, long-wavelength end of the absorption (which confers sensitivity to visible light) may be greatly minimized or eliminated by rendering the backbone more electron-poor. Finally, fully fluorinated substituents would eliminate C—H bonds in the polysilynes. This would be desirable in polymeric materials used as waveguides for optical communication wavelengths (1.3 to 1.5 μ, or the near IR). Absorption or overtones in or near this region must be minimized or eliminated in the waveguide by eliminating IR-absorbing functional groups such as C—H or O—H.

Partially or fully fluorinated substituents may be introduced into the polysilyne backbone by reaction of the triflate polymer with fluorinated Grignard or alkoxide reagents as depicted in equation 11:

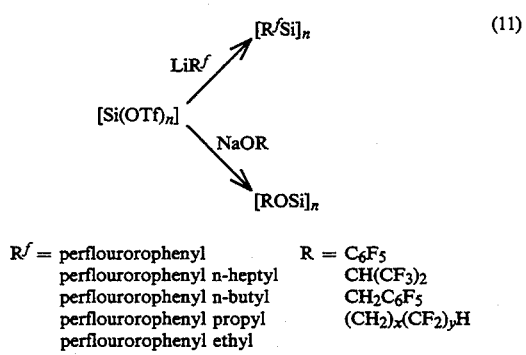

$R^f$ = perflourorophenyl
perflourorophenyl n-heptyl
perflourorophenyl n-butyl
perflourorophenyl propyl
perflourorophenyl ethyl R = $C_6F_5$
$CH(CF_3)_2$
$CH_2C_6F_5$
$(CH_2)_x(CF_2)_yH$ In addition, reactions of the polymer with an organic-soluble fluorinating agent (such as $NBu_4F$ or TAS-F) will give "polyfluorosilyne" $[SiF]_n$. This polymer would represent the silicon analogue of graphite fluoride $[CF]_n$, a widely studied electroactive material, and may display novel electronic properties.

The polysilyne backbone may also be functionalized with alkoxide, for example $NaOCH_2CH_2OCH_3$, or amide reagents which are water-solubilized as depicted in equation 12:

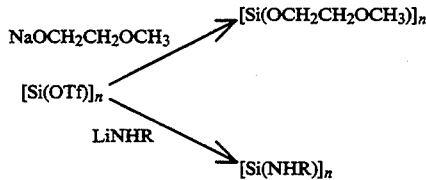

Alternatively, the polysilyne backbone may be functionalized with alkoxide or Grignard reagents bearing remote reactive groups, such as halides or vinyls, which can then be converted to hydrophilic groups (—COOR or —OH) in order to render the surface hydrophilic as shown in the following scheme 3:

Scheme 3

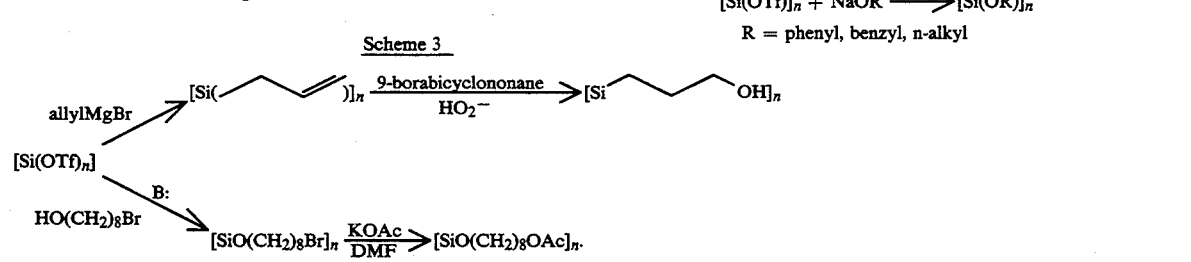

Such materials may act as water-soluble silicon microclusters, allowing the characteristic electro- and photochemistry of polysilynes to be extended to aqueous environments. If the sidechain includes a sufficiently long hydrophobic spacer group between the silicon backbone and the hydrophilic head group (Scheme 3), the new polymers may form micelles in aqueous solution. Reagents are able to enter the hydrophobic environment formed by the spacer groups and specific electrochemical or photochemical transformation of these reagents may then be mediated by the polymer backbone. These polymers therefore have the means of effecting selective chemical transformations in aqueous environments.

Polysilynes may also be functionalized with side groups which render them selective, efficient precursors to films of amorphous silicon, silicon carbide or silicon nitride as depicted in scheme 4:

Scheme 4

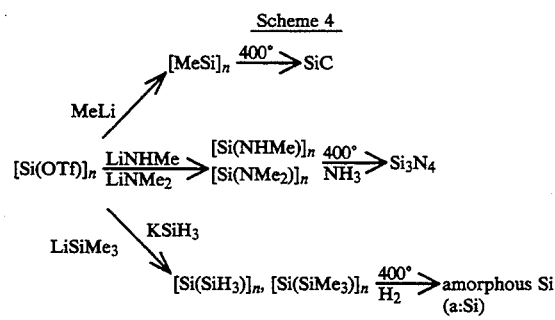

From one polymer backbone, the substituents and conditions necessary to produce these important ceramics or any combination of them can be deduced. Substituents can be varied to improve ceramic yield, minimize film shrinkage upon pyrolysis, or improve film quality and interaction with substrate. By incorporating varying amounts of different substitutent onto one polymer backbone, films consisting of any desired ceramic mixture may be produced. These polymers may also be used as low-temperature precursors to ceramic-matrix fiber-reinforced composites. They may be spun onto substrates over a layer of oriented ceramic fibers, then pyrolyzed at low temperature (ca. 400° C.) to give fiber-reinforces ceramic films. This route eliminates one of the major problems in the production of reinforced ceramic composited namely the high temperature required to deposit the ceramic matrix, which can be detrimental to the delicate fibers.

Polysilynes may also be functionalized with electron-donating alkoxide substituents in order to fabricate very electron-rich polymer backbones as depicted in equation 13 in which R may be phenyl, benzyl, n-alkyl or other alkyl groups:

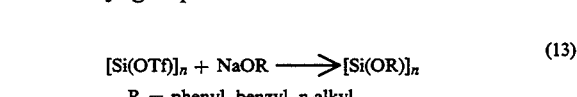

R = phenyl, benzyl, n-alkyl

Such alkoxide substitution on polysilanes renders the polymers more light sensitive, showing that more electrons participate in the characteristic sigma-sigma* transition in the more electronic-rich alkoxide-bearing polymer backbone.

Polysilanes have been shown to have very high third-order NLO coefficients, due to the long electron delocalization length found in these sigma-conjugated materials. Polysilynes, having sigma-conjugation which is even greater and extended into more dimensions, should also have high third-order NLO coefficients. Since the intensity of the electronic transition which gives rise to nonlinear optical properties should be enhanced by increasing the number of electrons which participate in the material's electronic transitions, polymers with very electron rich backbones may display higher NLO coefficients. Due to the much superior film-forming properties of the polysilynes over the linear polysilanes, greater potential exists for optical-quality materials.

Polysilynes may therefore be functionalized with varying mixtures of all the above groups, to produce materials whose properties are fine-tuned for a specific purpose. Solubility, stability, reactivity, optical and electronic properties, and elemental compositions may be varied as needed by optimizing side-chain composition.

Although there are many adaptions which can be made to the process according to the present invention, the choice of triflic acid is crucial to the success of the process. The polysilyne backbone is more rigid than that of the silanes and polysilanes which have been functionalized in the past, and this difference means that it is much harder to substitute on the polymer and that the substitution reaction proceeds at a much slower rate. Triflic acid is crucial, therefore, since when it becomes bound to the polysilyne backbone it still retains a reactive group allowing it to react more quickly than other acids (such as haloacids). Furthermore, when acid is added to the silanes and polysilanes as was done in the past, the acid will remove the pheny group. However, these polymers still retain an alkyl group on each silicon atom which helps to retain the solubility of the polymer so that further reactions are possible. Polysilynes have only a single alkyl or aryl group on each silicon atom so that when it is removed by acid treatment none remain to keep the polymer soluble. From prior research, we know that to keep polysilynes soluble, any acid of general formula HX must have an X group of at least 3 atoms in length. The only acid which has been found to fulfill this requirement to date is triflic acids which provides for the solubility and continued reactivity of the intermedicate polymer $[(OTf)Si]_n$ according to the present invention.

To obtain a better understanding of the process and resulting compounds prepared from the practice of the present invention, the following examples are presented. These examples have been designed to obtain a rigorous preparation of the copolymers according to the present invention, and only one substitution reagent is applied, specifically n-hexyl-magnesium bromide. However, as stated before, a number of different reagents may be used in obtaining specific polymers, which may be broadly defined as polysilynes with functional groups, and these additional reagents should be considered to be mere extensions of the present invention. Therefore, the following examples are given only to exemplify the present invention and not to limit the invention in any manner.

In the following examples, an appropriate amount of n-hexyl Grignard is added to the stirred polymeric intermediate solution, which then forms the final 70% poly(phenylsilyne), 30% poly(n-hexylsilyne) copolymer, and magnesiumbromotriflate salts as a byproduct. Work-up of the copolymer consists of washing the solution with water and precipitating with methanol.

The resulting copolymer yield is approximately 65%, where the remaining 35% being low molecular weight polymer dissolving into methanol during the reprecipitation process. Analysis of the copolymer by $^1$HNMR, IR, and UV, verifies the nearly quantitative substitution with no loss in polymeric integrity of the final product.

EXAMPLE I

Synthesis of Poly(phenylsilyne)

An oven-dried 400 ml beaker was placed in a nitrogen atmosphere purge drybox. The drybox was equipped with a high intensity (375 W, 20 KHz, ½" tip) ultrasonic immersion horn. 200 ml of anhydrous THF was added to the beaker followed by immersion of the ultrasonic horn tip. The solvent was irradiated at full power, and 9.0 ml of NaK alloy (285 mmol, 2.85 eq) was added. Sonication generated a blue emulsion, and after 3 minutes, monomer addition was begun. 16.0 ml of phenyltrichlorosilane (100 mmol, 1.00 eq) was added at a controlled rate with an addition funnel over 10 minutes. Once all the monomer was consumed, the reaction was sonicated at full power for another 10 minutes. The pH of the resulting dark green/blue polymer solution was tested, using hydrolyzed aliquots of the reaction mixture, to ensure complete removal of chlorine from the monomer units. If the aliquot test was acidic, titration of more phenylmagnesium chloride to the stirred polymer solution was necessary to remove residual chlorine and effectively "cap" the polymer. Once the pH test was neutral, the polymer was cautiously quenched outside of the drybox behind a hood shield (care is required at this point of the process since if residual NaK alloy is present or excess Grignard is added, the solution may violently ignite). Once water has been added to the stirred polymer solution, the orange polymer/THF solution layer could be safely separated and precipitated with methanol. The yellow polymer was further purified by dissolving it in THF and reprecipitating it with ethanol, followed by drying overnight under vacuum.

The quantitative yield of poly(phenylsilyne) was 3.35 grams with an approximate GPC weight average molecular weight of $M_w = 7000$ (vs polystyrene standards) and a polydispersity of 2.0.

EXAMPLE II functionalization of poly(phenylsilyne) with triflic acid and n-hexylmagesium bromide An oven dried 100 ml round bottom schlenk flask with a Teflon stir bar was placed in a nitrogen atmosphere purge drybox. 1.19 g of poly(phenylsilyne) (11.3 mmol) was added to the flask followed by 50 ml of anhydrous toluene or 50 ml of methylene chloride/toluene co-solvent system. The contents were stirred until all the polymer was dissolved giving a transparent orange solution. 0.30 ml of triflic acid (3.4 mmol) was slowly added dropwise with an oven dried all glass syringe. The drops were added at a maximum rate of one every 5 seconds, and the copolymer intermediate solution was stirred for 24 hours followed by the addition of 1.98 ml of n-hexylmagnesium bromide (3.96 mmol, 2.0M in ether) while continually stirring the reaction mixture. The final copolymer solution was was stirred for 24 hours and then purified by washing with water and the product was precipitated with methanol. The copolymer was dried under vacuum.

the final copoly[(phenylsilyne)(n-hexylsilyne)] was characterized by $^1$H NMR sigma=7.0(br), 0.95(br), 0.79(br). IR (neat film on KBr, cm$^{-1}$) 3045(vs), 2924(vs), 2087(w), 1953(w), 1428(s), 1261(w), 1188(w), 1155(w), 1090(s), 1066(s) 1066(m), 1024(m), 996(m), 851(w), 802(w), 730(s), 697(vs).

Thus, while we have illustrated and described the preferred embodiment of our invention, it is to be understood that this invention is capable of variation and modification, and we therefore do not wish to be limited to the precise terms set forth, but desire to avail ourselves of such changes and alterations which may be made for adapting the invention to various usages and conditions. Accordingly, such changes and alterations are properly intended to be within the full range of equivalents, and therefore within the purview of the following claims.

Having thus described our invention and the manner and process of making and using it in such clear, concise and exact terms so that to enable any person skilled in the art to which it pertains, or with which it is most nearly connected, to make and use the same;

What is claimed is:

1. A process for the addition of functional groups to a polysilyne polymer in which the number of monomeric units has a value between 300 and 1000, which comprises:
   (a) reacting triflic acid with a poly(phenylsilyne) polymer by adding the triflic acid to a solution of the poly(phenylsilyne) polymer in a solvent selected from the group consisting of anhydrous toluene and mixtures of methylene chloride and toluene to form a triflate-substituted polysilyne polymer; and
   (b) reacting the triflate-substituted polysilyne polymer of step (a) with a reagent selected from the group consisting of an alkyllithium reagent, a Grignard reagent, an alkoxide salt, an amide salt to form a resultant polysilyne polymer.

2. A process according to claim 1, wherein said poly(phenylsilyne) polymer of step (a) is a copolymer of poly(phenylsilyne) with poly(alkylsilyne).

3. A process according to claim 1, wherein less than all The triflate substituents of the triflate-substituted polysilyne polymer are reacted with the reagent in step (b), and the process further comprises the step of
   (c) reacting the resultant polysilyne polymer of step (b) with a Grignard reagent.

4. A process according to claim 1, wherein the resultant polysilyne polymer of step (b) is a fluorinated polysilyne polymer.

5. A process according to claim 4, wherein the reagent in step (b) is selected from the group consisting of a fluorinated alkyllithium salt, a Grignard reagent and a fluorinated alkoxide salt.

6. A process for producing amorphous silicon, which comprises:
   (a) reacting triflic acid with a poly(phenylsilyne) polymer by adding the triflic acid to a solution of said poly(phenylsilyne) polymer in a solvent selected from the group consisting of anyhydrous toluene and mixtures of methylene chloride and toluene to form a triflate-substituted polysilyne polymer; and
   (b) reacting said triflate-substituted polysilyne polymer with Grignard or alkoxide reagents to form a resultant polyfluorosilyne polymer.

7. A polysilyne polymer produced according to the process of claim 1.

8. A polysilyne polymer produced according to the process of claim 2.

9. A polysilyne polymer produced according to the process of claim 3.

10. A polysilyne polymer produced according to the process of claim 4.

11. A polysilyne polymer produced according to the process of claim 5.

* * * * *